United States Patent
McCaffrey et al.

(10) Patent No.: US 10,422,241 B2
(45) Date of Patent: Sep. 24, 2019

(54) BLADE OUTER AIR SEAL SUPPORT FOR A GAS TURBINE ENGINE

(71) Applicant: UNITED TECHNOLOGIES CORPORATION, Farmington, CT (US)

(72) Inventors: Michael G. McCaffrey, Windsor, CT (US); Peter Balawajder, West Hartford, CT (US); David Richard Griffin, Tolland, CT (US); Benjamin F. Hagan, Winston-Salem, NC (US)

(73) Assignee: United Technologies Corporation, Farmington, CT (US)

( * ) Notice: Subject to any disclaimer, the term of this patent is extended or adjusted under 35 U.S.C. 154(b) by 744 days.

(21) Appl. No.: 15/071,320

(22) Filed: Mar. 16, 2016

(65) Prior Publication Data
US 2017/0268366 A1    Sep. 21, 2017

(51) Int. Cl.
*F01D 11/08* (2006.01)
*F01D 25/24* (2006.01)

(52) U.S. Cl.
CPC ............ *F01D 11/08* (2013.01); *F01D 25/246* (2013.01); *F05D 2220/32* (2013.01); *F05D 2240/11* (2013.01); *F05D 2240/55* (2013.01); *F05D 2260/201* (2013.01); *F05D 2260/30* (2013.01); *F05D 2260/36* (2013.01); *F05D 2300/131* (2013.01); *F05D 2300/20* (2013.01); *F05D 2300/502* (2013.01); *F05D 2300/607* (2013.01); *F05D 2300/6033* (2013.01); *Y02T 50/672* (2013.01); *Y02T 50/676* (2013.01)

(58) Field of Classification Search
None
See application file for complete search history.

(56) References Cited

U.S. PATENT DOCUMENTS

| 4,087,199 | A | * | 5/1978 | Hemsworth | ............ F01D 11/08 415/173.3 |
| 4,247,248 | A | * | 1/1981 | Chaplin | .................. F01D 11/24 415/136 |
| 4,527,385 | A | | 7/1985 | Jumelle et al. | |
| 4,596,116 | A | * | 6/1986 | Mandet | ................... F01D 11/08 415/173.2 |

(Continued)

FOREIGN PATENT DOCUMENTS

| GB | 2397102 | 7/2004 |
| WO | 2015038906 | 3/2015 |

(Continued)

OTHER PUBLICATIONS

European Search Report for Application No. 17161252.6 dated Aug. 17, 2017.

*Primary Examiner* — Kayla Mccaffrey
(74) *Attorney, Agent, or Firm* — Carlson, Gaskey & Olds, P.C.

(57) ABSTRACT

A blade outer air seal support includes, at least one arc body having a first portion and a second portion, a blade outer air seal mounting region defined at least partially between the first portion and the second portion, and an interface feature interfacing the first portion and the second portion. The interface feature is configured such that axially aligned forces are communicated between the first and second portions through the interface feature, bypassing the blade outer air seal mounting region.

19 Claims, 6 Drawing Sheets

(56) References Cited

U.S. PATENT DOCUMENTS

| | | | |
|---|---|---|---|
| 4,728,257 A | 3/1988 | Handschuh | |
| 4,759,687 A | 7/1988 | Miraucourt et al. | |
| 5,092,735 A * | 3/1992 | Katy | F01D 11/08 |
| | | | 415/115 |
| 5,609,469 A | 3/1997 | Worley et al. | |
| 5,639,210 A | 6/1997 | Carpenter et al. | |
| 6,142,731 A | 11/2000 | Dewis et al. | |
| 6,431,825 B1 | 8/2002 | McLean | |
| 6,726,448 B2 | 4/2004 | McGrath et al. | |
| 6,733,235 B2 | 5/2004 | Alford et al. | |
| 6,896,484 B2 * | 5/2005 | Diakunchak | F01D 11/18 |
| | | | 415/173.1 |
| 7,052,235 B2 | 5/2006 | Alford et al. | |
| 7,163,206 B2 | 1/2007 | Cross et al. | |
| 7,435,049 B2 | 10/2008 | Ghasripoor et al. | |
| 7,527,472 B2 | 5/2009 | Allen | |
| 7,959,407 B2 | 6/2011 | Tholen | |
| 8,123,466 B2 | 2/2012 | Pietraszkiewicz et al. | |
| 8,303,247 B2 | 11/2012 | Schlichting et al. | |
| 8,439,636 B1 | 5/2013 | Liang | |
| 8,534,995 B2 | 9/2013 | McCaffrey | |
| 8,568,091 B2 * | 10/2013 | McCaffrey | F01D 11/125 |
| | | | 415/173.3 |
| 8,585,357 B2 * | 11/2013 | DiPaola | F01D 25/246 |
| | | | 415/173.6 |
| 8,596,963 B1 | 12/2013 | Liang | |
| 8,790,067 B2 * | 7/2014 | McCaffrey | F01D 11/18 |
| | | | 415/1 |
| 8,876,458 B2 | 11/2014 | Thibodeau et al. | |
| 8,920,127 B2 | 12/2014 | McCaffrey | |
| 8,944,756 B2 | 2/2015 | Lagueux | |
| 9,039,358 B2 | 5/2015 | Tholen et al. | |
| 9,115,596 B2 | 8/2015 | Clouse | |
| 9,169,739 B2 | 10/2015 | Mironets et al. | |
| 9,200,530 B2 | 12/2015 | McCaffrey | |
| 9,228,447 B2 | 1/2016 | McCaffrey | |
| 2006/0038358 A1 | 2/2006 | James | |
| 2008/0211192 A1 | 9/2008 | Pietraszkiewicz et al. | |
| 2009/0096174 A1 | 4/2009 | Spangler et al. | |
| 2009/0169368 A1 | 7/2009 | Schlichting et al. | |
| 2009/0208322 A1 | 8/2009 | McCaffrey | |
| 2010/0226760 A1 | 9/2010 | McCaffrey | |
| 2011/0044803 A1 | 2/2011 | Di Paola et al. | |
| 2011/0044804 A1 | 2/2011 | DiPaola et al. | |
| 2012/0195743 A1 | 8/2012 | Walunj et al. | |
| 2012/0275898 A1 | 11/2012 | McCaffrey et al. | |
| 2013/0017057 A1 | 1/2013 | Lagueux | |
| 2013/0022469 A1 | 1/2013 | McCaffrey | |
| 2013/0113168 A1 | 5/2013 | Lutjen et al. | |
| 2013/0209240 A1 | 8/2013 | McCaffrey | |
| 2014/0016761 A1 | 1/2014 | Werner | |
| 2014/0017072 A1 | 1/2014 | McCaffrey | |
| 2014/0023480 A1 | 1/2014 | McCaffrey | |
| 2014/0033149 A1 | 1/2014 | Groves et al. | |
| 2014/0044528 A1 | 2/2014 | Clouse | |
| 2014/0053040 A1 | 2/2014 | Hargan | |
| 2014/0127006 A1 | 5/2014 | Romanov et al. | |
| 2014/0133955 A1 | 5/2014 | McCaffrey et al. | |
| 2014/0186152 A1 | 7/2014 | McCaffrey et al. | |
| 2015/0016954 A1 | 1/2015 | Thibodeau et al. | |
| 2015/0031764 A1 | 1/2015 | Kraus et al. | |
| 2015/0226132 A1 | 8/2015 | Thill et al. | |
| 2015/0337672 A1 | 11/2015 | McCaffrey et al. | |
| 2015/0369076 A1 | 12/2015 | McCaffrey et al. | |
| 2016/0003078 A1 | 1/2016 | Stevens et al. | |
| 2016/0003080 A1 | 1/2016 | Mcgarrah | |

FOREIGN PATENT DOCUMENTS

| | | |
|---|---|---|
| WO | 2015047478 | 4/2015 |
| WO | 2015061108 | 4/2015 |
| WO | 2015088656 | 6/2015 |
| WO | 2015109292 | 7/2015 |
| WO | 2015112354 | 7/2015 |

* cited by examiner

BLADE OUTER AIR SEAL SUPPORT FOR A GAS TURBINE ENGINE

TECHNICAL FIELD

The present disclosure relates generally to blade outer air seals for gas turbine engines, and more specifically to a blade outer air seal support for a gas turbine engine.

BACKGROUND

Gas turbine engines, such as those utilized in commercial and military aircraft, include a compressor section that compresses air, a combustor section that mixes the compressed air with a fuel and ignites the mixture, and a turbine section across which the resultant combustion products are expanded. Expansion of the combustion products across the turbine section drives the turbine section to rotate, which in turn drives rotation of the compressor.

The turbine section may include multiple stages of rotatable blades and static vanes. An annular shroud, such as a blade outer air seal, may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY OF THE INVENTION

A blade outer air seal support according to an example of the present disclosure includes at least one arc body that has a first portion and a second portion, a blade outer air seal mounting region defined at least partially between the first portion and the second portion, and an interface feature interfacing the first portion and the second portion, the interface feature being configured such that axially aligned forces are communicated between the first and second portions through the interface feature, bypassing the blade outer air seal mounting region.

In another embodiment of the above described blade outer air seal support the at least one arc body is a plurality of segments, each of the segments being connected to two adjacent segments via a featherseal.

In another embodiment of any of the above described blade outer air seal supports the first portion comprises a radially outward facing surface, the second portion comprises a radially inward facing surface, and the interface feature is at least partially comprised of contact between the radially outward facing surface and the radially inward facing surface.

Another embodiment of any of the above described blade outer air seal supports further includes a plurality of fasteners protruding through the second portion into the first portion.

In another embodiment of any of the above described blade outer air seal supports the first portion contacts a blade outer air seal received in the blade outer air seal mounting region via a dynamic seal.

In another embodiment of any of the above described blade outer air seal supports the dynamic seal is a diaphragm seal.

In another embodiment of any of the above described blade outer air seal supports the interface feature includes an axially aligned intrusion into the first portion, an axially aligned protrusion from the second portion, and the axially aligned protrusion from the second portion is received in the axially aligned intrusion in the first portion.

In another embodiment of any of the above described blade outer air seal supports the axially aligned intrusion includes a radially outward facing sealing surface, the axially aligned protrusion includes a radially inward facing sealing surface, and the radially outward facing sealing surface contacts the radially inward facing sealing surface.

Another embodiment of any of the above described blade outer air seal supports further includes an axially facing surface of the second portion extending radially inward from a base of the protrusion, and an axially facing surface of the first portion is spaced apart from the axially facing surface of the second portion, and defines a gap between the axially facing surface of the second portion and the axially facing surface of the first portion.

In another embodiment of any of the above described blade outer air seal supports an axially aligned section of at least one of the first and second portion includes a plurality of through holes configured to allow a cooling fluid to pass from a radially outward source to a radially outward facing surface of a blade outer air seal.

In another embodiment of any of the above described blade outer air seal supports a blade outer air seal is mounted within the mounting region, and the blade outer air seal is formed of a high thermal-resistance low-toughness material.

In another embodiment of any of the above described blade outer air seal supports the high thermal-resistance low-toughness is one of a monolithic ceramic, a ceramic matrix composite, and a molybdenum based alloy.

In another embodiment of any of the above described blade outer air seal supports the first portion and the second portion are constructed of the same material.

In another embodiment of any of the above described blade outer air seal supports the first portion and the second portion are constructed of distinct materials.

In another embodiment of any of the above described blade outer air seal supports a section of the interface feature disposed on the first portion is intermittent along an arc length of the arc body.

A method for protecting a blade outer air seal according to an example of the present disclosure includes mounting a blade outer air seal within a mounting region of a blade outer air seal support, and passing axial forces contacting the blade outer air seal support through an interface feature of the blade outer air seal support, thereby bypassing the blade outer air seal.

In a further example of the above described method for protecting a blade outer air seal the mounting region is defined, at least in part, by a first portion of the blade outer air seal support and a second portion of the blade outer air seal support, the first portion and the second portion being interfaced by an interface feature.

Another example of any of the above described methods for protecting a blade outer air seal further includes cooling a radially outward facing surface of the blade outer air seal by passing a cooling fluid through impingement cooling holes in the blade outer air seal support, thereby generating impingement coolant jets.

A further example of any of the above described methods for protecting a blade outer air seal includes a plurality of blade outer air seal arc segments, each of the arc segments being connected to two adjacent arc segments via a featherseal. Each of the arc segments including a first portion connected to a second portion via an interface feature, the first portion and the second portion defining a radially inward mounting region, and the arc segments being configured such that axially aligned forces are passed through the interface feature, bypassing the mounting region.

In a further example of any of the above described methods for protecting a blade outer air seal each of the arc segments is uniform.

These and other features of the present invention can be best understood from the following specification and drawings, the following of which is a brief description.

DETAILED DESCRIPTION OF AN EMBODIMENT

Figure 1:
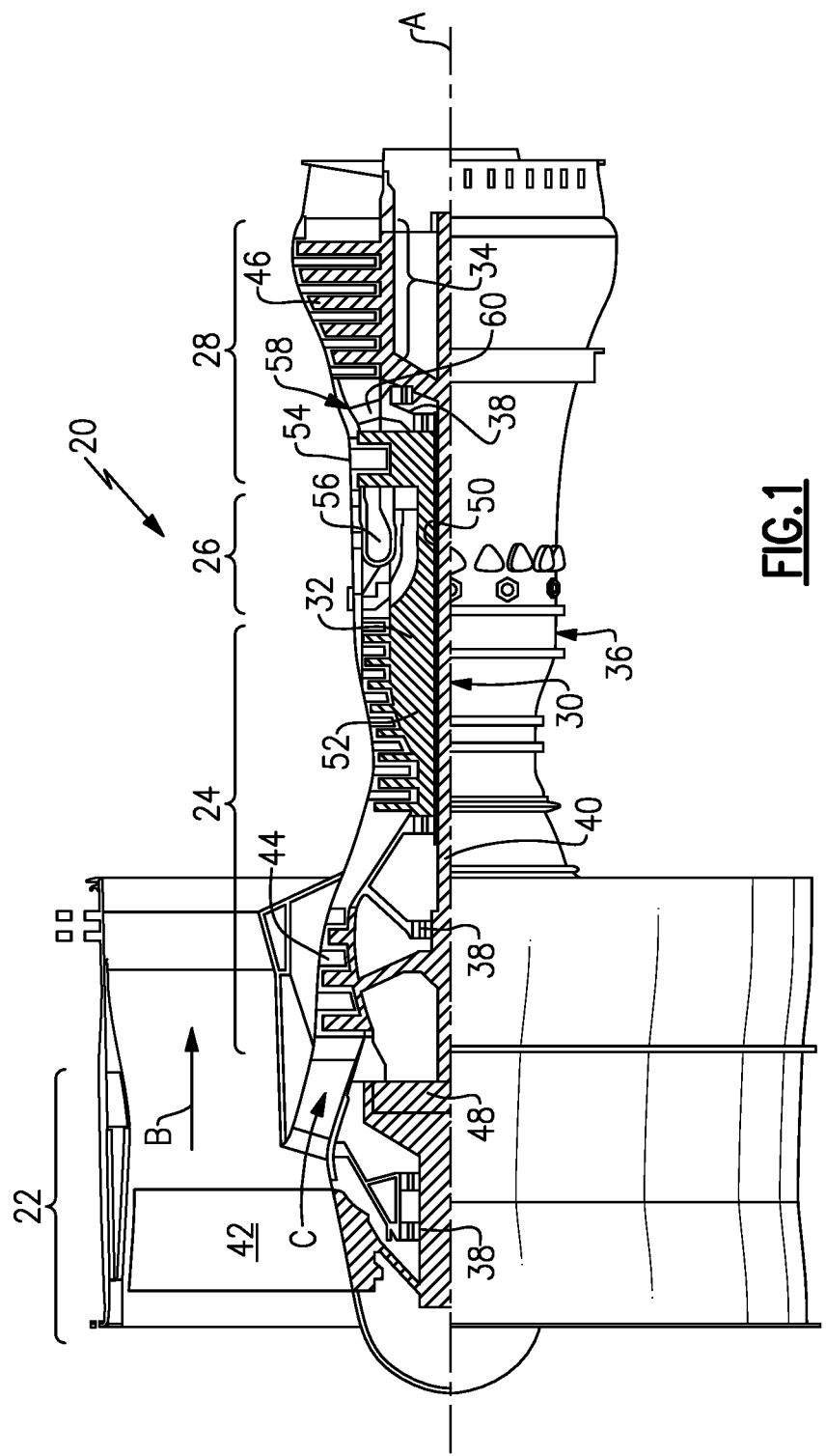
FIG. 1 schematically illustrates a gas turbine engine according to one example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (1066.8 meters). The flight condition of 0.8 Mach and 35,000 ft (1066.8 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/s).

During operation of the gas turbine engine 20, the combustor section 26 and the turbine section 28 are exposed to extreme temperatures within the primary flowpath C. In order to mitigate the thermal stresses imparted on the various flowpath components, such as blade outer air seals, cooling systems are typically implemented to actively and passively cool the flowpath components. In addition to the cooling systems, flowpath components are constructed of materials that have properties designed for, or capable of, withstanding high thermal stresses.

Although not limited to this construction, some components, such as sealing elements, may be monolithic bodies that are formed of a high thermal-resistance, low-toughness material capable of withstanding high thermal stresses. For example, some components may be formed of a high thermal-resistance low-toughness metallic alloy or a ceramic-based material, such as a monolithic ceramic or a ceramic matrix composite. One example of a high thermal-resistance low-toughness metallic alloy is a molybdenum-based alloy. Monolithic ceramics may be, but are not limited to, silicon carbide (SiC) or silicon nitride ($Si_3N_4$). In certain configurations, however, such materials are brittle, and can suffer damage when exposed to forces aligned with certain vectors.

One exemplary component that can be created utilizing such a material is a sealing component for a blade outer air seal. Some example blade outer air seals constructed using such materials are susceptible to damage when force aligned with the axis of the gas turbine engine 20 is applied to the blade outer air seal. In order to prevent this damage, a blade outer air seal support is utilized that redirects the axially aligned forces, and causes the axially aligned forces to be transmitted around the blade outer air seal, through the support, thereby preventing damage resulting from typical axial engine loads.

Figure 2:
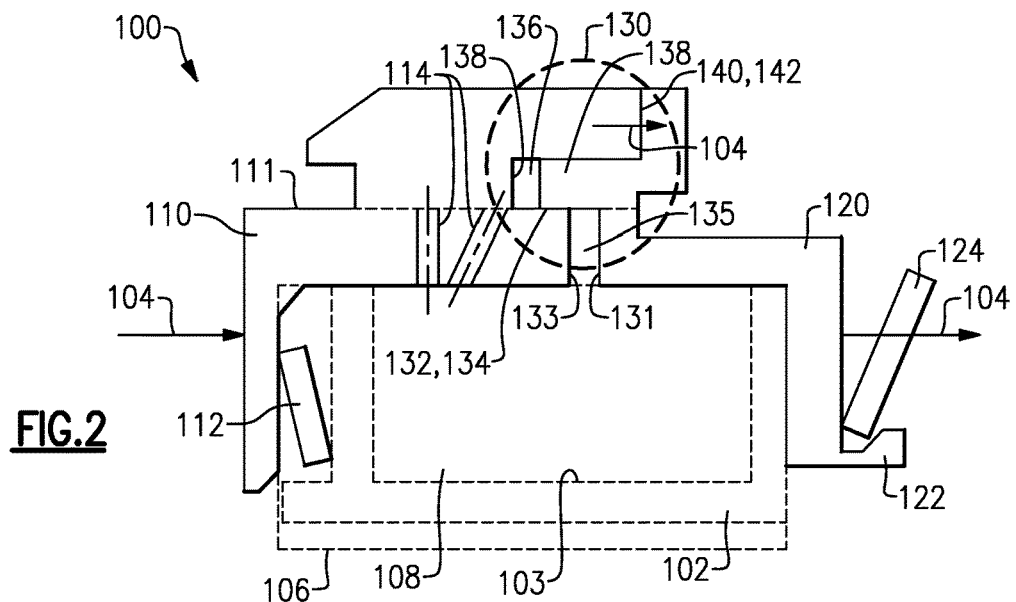
FIG. 2 schematically illustrates a cross sectional view of a first example blade outer air seal support.
Figures 3, 4:
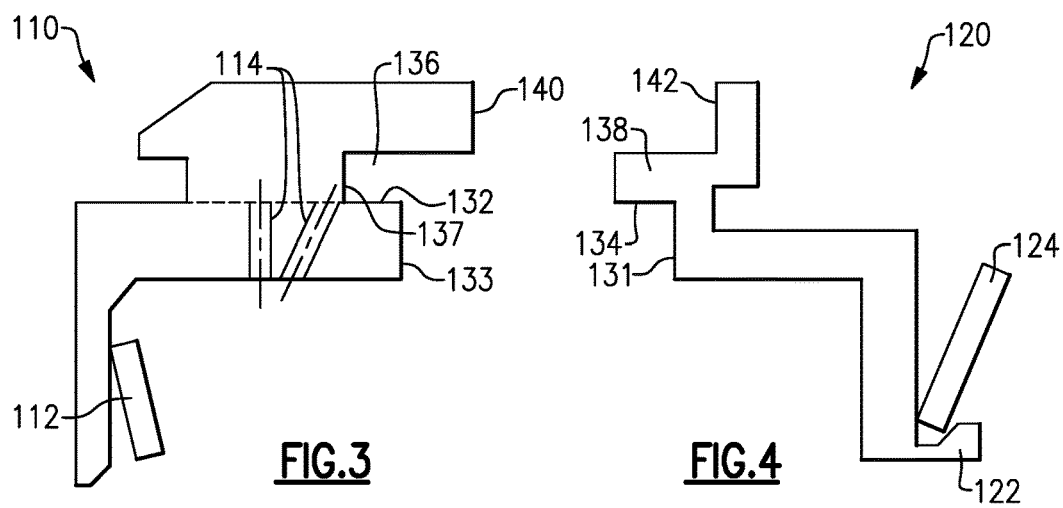
FIG. 3 schematically illustrates a first portion of the example blade outer air seal support of FIG. 2.
FIG. 4 schematically illustrates a second portion of the example blade outer air seal support of FIG. 2.

With reference now to FIGS. 2, 3 and 4, FIG. 2 schematically illustrates a cross sectional view of a blade outer air seal support or carriage 100 supporting a blade outer air seal (arc segment) 102. The blade outer air seal 102 is constructed of a high thermal-resistance, low-toughness material. FIG. 3 schematically illustrates a first portion 110 of the blade outer air seal support 100. FIG. 4 schematically illustrates a second portion 120 of the blade outer air seal support 100. The blade outer air seal support 100 is constructed of an arc body including a first portion 110 and a second portion 120 that are interfaced together via an interface features 130. In some examples, the first portion 110 and the second portion 120 are constructed of the same material in order to prevent thermal expansion/contraction mismatches. In alternative examples, the first portion 110 and the second portion 120 are constructed of complimentary, but distinct, materials and are designed to minimize the impact of thermal expansion/contraction.

The interface feature 130 is configured such that axially aligned forces 104 applied to the first portion 110 are shifted radially to the interface feature 130, and passed through the interface feature 130 into the second portion 120. Similarly, axially aligned forces 104 applied to the second portion 120 are shifted radially to the interface feature 130, and passed through the interface feature 130 into the first portion 110.

By configuring the interface feature 130 to radially shift the axially aligned forces, a neutral zone 106 is defined by the first and second portions 110, 120 of the blade outer air seal support 100. Within the neutral zone 106, minimal or no axial forces are applied. A mounting region 108 is defined within the neutral zone 106. The blade outer air seal 102 is mounted within the mounting region 108. The blade outer air seal 102 is connected to the first and second portions 110, 120, via any standard mounting connections, and via a seal 112. In some examples the seal 112 is a diaphragm seal. In alternative examples, alternative dynamic seal types capable of providing similar effects to those provided by a diaphragm seal can be utilized.

Figure 8:
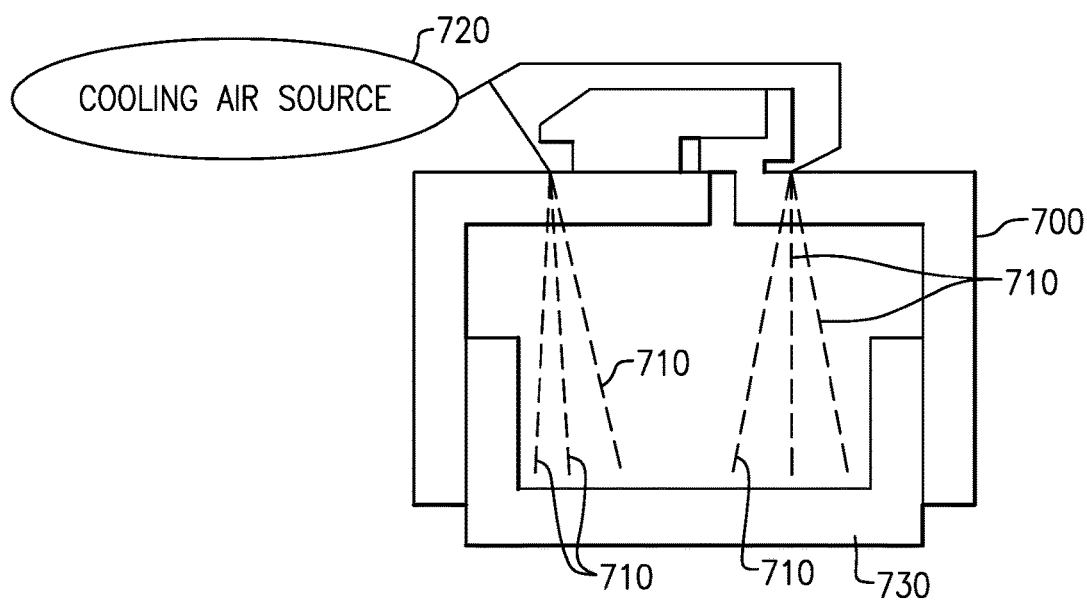
FIG. 8 schematically illustrates impingement cooling of a backside of a blade outer air seal through cooling holes in a blade outer air seal support.

In some examples, cooling holes 114 connect a radially outward facing surface 111 of the first portion 110 to the mounting region 108. The cooling holes 114 allow a cooling fluid to be passed directly into the mounting region 108, thereby cooling a radially outward facing backside 103 of the blade outer air seal 102. The cooling holes 114 can be radially aligned, partially radially aligned, or a mixture of both. In the illustrated example, the cooling holes 114 are positioned only on the first portion 110. One of skill in the art, having the benefit of this disclosure, will understand that cooling holes 114 can be included in either portion 110, 120 of the support 100 or both portions 110, 120 of the support 100 depending on the needs and configuration of a given engine system. Further detail with regards to the cooling holes 114 is provided below with regards to FIG. 8.

The interface feature 130 includes a radially outward facing sealing surface 132 of the first portion 110 and a radially inward facing sealing surface 134 of the second portion. The sealing surfaces 132, 134 contact each other and form a seal, preventing air from undesirably leaking through the blade outer air seal support 100. In some embodiments, radial forces resulting from engine operation are sufficient to maintain contact between the sealing surfaces 132, 134 during operation of the gas turbine engine 20. Further, once assembled, radial and axial engine loads are sufficient to maintain the relative axial positions of the first and second portions 110, 120.

The exemplary interface feature includes a radially aligned intrusion 136 into the first portion 110 of the blade outer air seal. A corresponding and complimentary, radially aligned protrusion 138 from the second portion 120 of the blade outer air seal is received in the intrusion 136. A gap is defined between an end of the protrusion 138 and an interior surface 137 of the intrusion 136. An axially facing surface 131 of the second portion 120 extends radially inward from the protrusion 138. The axially facing surface 131 is spaced apart from, and aligned with, a corresponding axial facing surface 133 of the first portion 110. A gap 135 is defined between the facing surfaces 133, 131. The gap 135 allows relative movement of the first and second portion 110, 120. An axially facing surface 140 on 110 and 142 on 120 are defined without a gap, such that they restrict relative axial motion between 110 and 120. The relative movement at the interface features 140 and 142 operate to direct axial forces placed on either the first or second portion 110, 120 to the radially outermost portion of the interface feature 130.

Figure 2A:
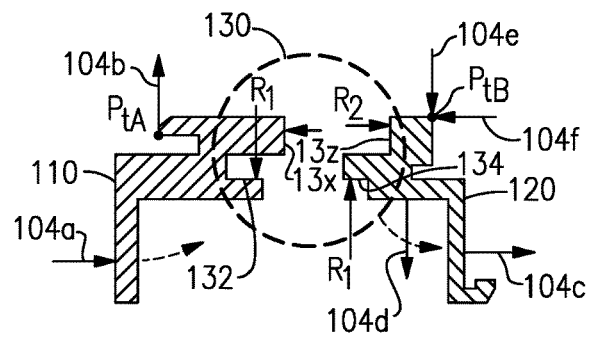
FIG. 2A schematically illustrates a force diagram of the first and second portions of the blade outer air seal support.

With continued reference to FIG. 2, FIG. 2A illustrates force interactions between the first portion 110 and the second portion 120. An axial force 104a applied to the first portion 110 is reacted through the forward radial attachment feature at point A (PtA) as force 104b and a contact between the contacting axial facing surfaces 140, 142 at interface feature 130. PtA provides a radial constraint, and due to its relative position to 130, the resultant axial load 104a and radial load 104b result in a moment which is reacted through the interface feature 130. During operation there is a radial load 104d and an axial load 104c created by the BOAS, acting upon the second portion 120. The second portion 120 loads are reacted through the interface feature 130 and a radial and axial constraint at point B (PtB). The nature of the loads 104c and 104d result in a moment about PtB, which is reacted through interface feature 130.

Interface feature 130 consists of interface surface pairs 132/134 and 140/142. Surface 132 is capable of radial load transmission in support 110 into the radial surface 134 of the first portion 120. Simultaneously, the axial facing surface 140 is capable of axial load transmission in support portion 110, into axial facing surface 142 on the second portion 120. The nature of the applied loads 104a, 104c, 104d, and the constraint loads 104b, 104e, 104f, is such that they create reaction loads R1 and R2 at the interface region 130. The placement of surface pairs 132/134 and 140/142 results in a stable compressive loads R1 and R2, thus restraining motion of the first portion 110 relative to the second portion 120, and maintaining the isolated zone 106.

The second portion 120 includes a connection feature 122 that allows the second portion 120 to connect to adjacent components within the gas turbine engine 20. Attached to the connection feature 122 is a seal 124. In some examples, the seal 124 is a diaphragm seal. In alternative examples, the seal 124 can be any similar type of dynamic seal.

In the illustrated example of FIG. 2, as well as the isometric example of FIG. 6 (described below), the section of the interface feature 130 on the first portion 110 does not extend the full arc length of the blade outer air seal support 100. Rather, the section of the interface feature 130 on the first portion 110 is intermittent. In alternative examples, such as the example illustrated in FIG. 5, the interface feature 130 extends the full arc length of the blade outer air seal support 100 without circumferential breaks on either portion 110, 120.

Figure 5:
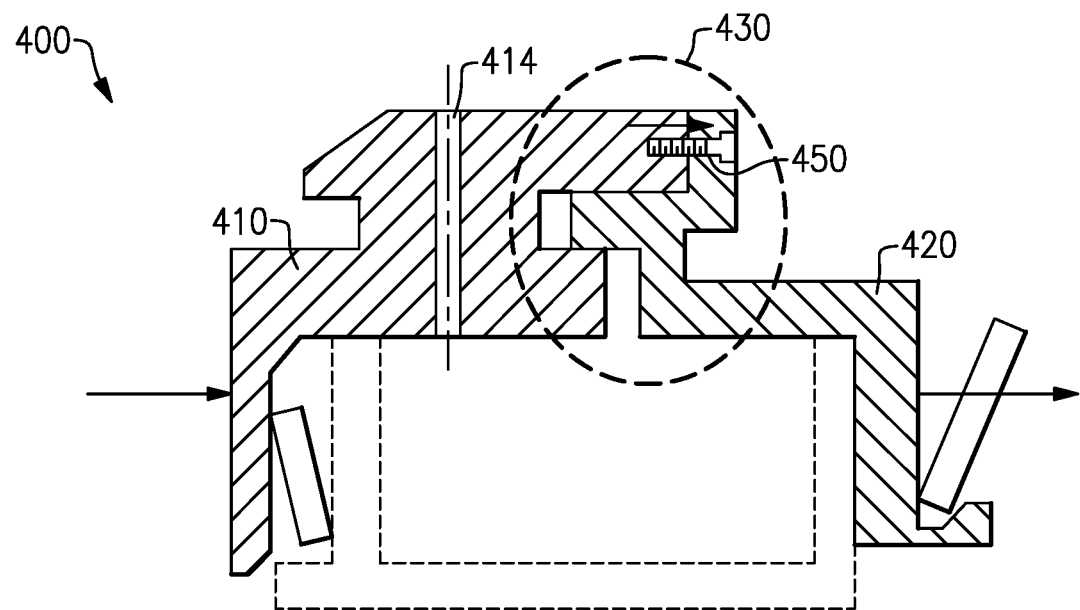
FIG. 5 schematically illustrates an alternate example blade outer air seal support.

With continued reference to FIGS. 2-4, and with like numerals indicating like elements, FIG. 5 schematically illustrates a cross sectional view of an alternate example blade outer air seal support 400. As with the example of FIGS. 2-4, the blade outer air seal support 400 includes a first portion 410 and a second portion 420, with the first and second portions 410, 420 being interfaced via an interface feature 430.

In contrast to the example of FIGS. 2-4, the section of the interface feature 430 included on the first portion 410 of the support 400 extends a full arc length of the blade outer air seal support 400. Exemplary cooling holes 414 in such a configuration extend through portions of the interface feature 430 and can be included in both the first portion 410 and the second portion 420 of the blade outer air seal support 400, as in the example of FIGS. 2-4.

Further, a fastener 450 is positioned in, and protrudes through, the section of the interface features 430 disposed on the second portion 420. In a practical example, multiple fasteners 450 are positioned in a similar manner along a circumferential arc of the blade outer air seal support 400. Further, while the illustrated fastener 450 is a threaded bolt, one of skill in the art will understand that any fastener capable of maintaining contact between the first portion 410 and the second portion 420 at the interface feature 430 can be utilized in place of the illustrated fastener 450.

The fastener 450 maintains contact between the first and second portions 410, 420 of the blade outer air seal support 400 during assembly of the gas turbine engine 20. Once the engine is assembled, typical engine loads resulting from adjacent engine components are sufficient to maintain the relative axial positions of the portions 410, 420, and the fasteners 450 are no longer required. In some examples, the fasteners 450 can be removed during assembly in order to conserve weight. In alternative examples, the fasteners 450 can remain in the blade outer air seal support 400.

Figure 6:
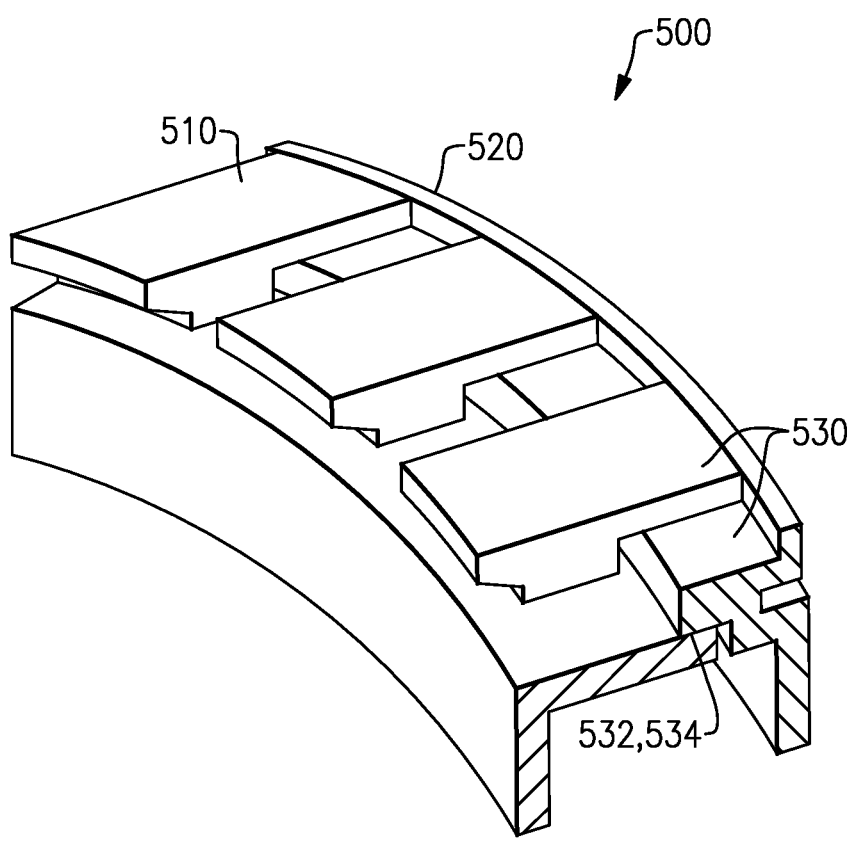
FIG. 6 schematically illustrates an isometric view of an example blade outer air seal support.

With continued reference to FIGS. 2-5, FIG. 6 illustrates an isometric view of a blade outer air seal support 500, according to the example of FIG. 2. The blade outer air seal support 500 includes an intermittent section of the interface feature 530 on the first portion 510 and a non-intermittent section of the interface feature 530 on the second portion 520. The exemplary blade outer air seal support 500 of FIG. 6 is a segment of a segmented blade outer air seal configuration, with the completed configuration described in greater detail below with regards to FIG. 7.

Figure 7:
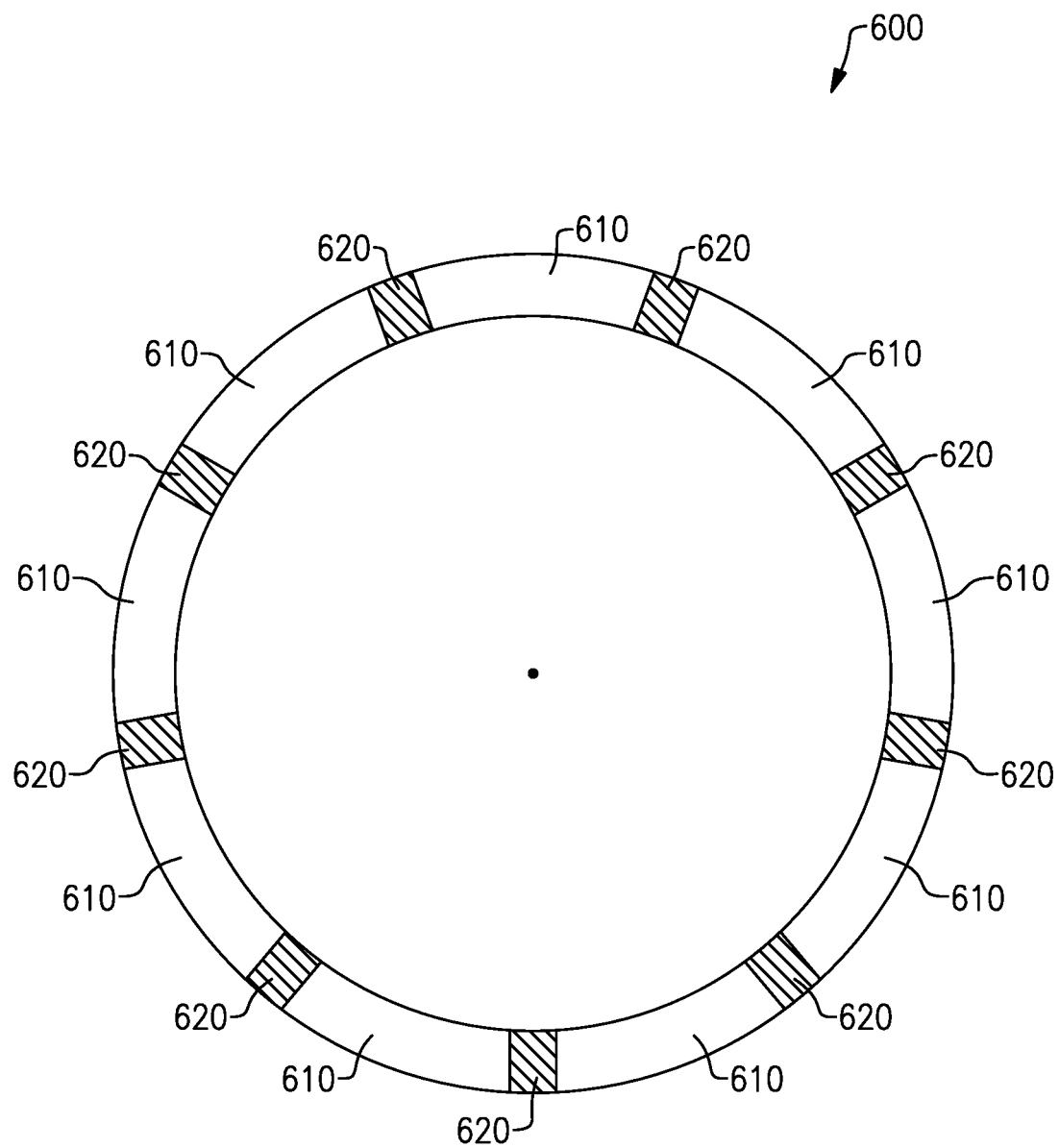
FIG. 7 schematically illustrates a segmented ring configuration of a blade outer air seal support.

Referring now to FIG. 7, and with reference back to FIGS. 2-6, FIG. 7 schematically illustrates a segmented ring configuration of a blade outer air seal assembly 600. One of skill in the art will understand that the illustration of FIG. 7 is highly schematic, is not to scale, and that certain features are exaggerated or omitted for explanatory purposes. The blade outer air seal assembly 600 includes multiple distinct segments 610, with each of the segments 610 being the arc length of the arc body of that segment. Each of the segments is constructed of a blade outer air seal support, such as the support 100 described above with regards to FIGS. 2-4, and a blade outer air seal mounted within each support 100. Each segment 610 is an arc, which forms part of a complete ring. Each of the segments 610 is connected to, and sealed to, each adjacent segment 610 via a featherseal 620. In some examples, each segment 610 is identical to each other segment 610. In alternative examples, one or more segments 610 can be distinct from the other segments 610 in arc length, or any other feature, depending on the needs and constraints of a given gas turbine engine system.

With continued reference to FIGS. 2-7, FIG. 8 schematically illustrates impingement cooling of a backside of a blade outer air seal via impingement cooling through cooling holes, such as the cooling holes 114 illustrated in FIGS. 2, 3 and 5. Backside cooling, such as the cooling facilitated by the cooling holes 114 maintains a lower temperature of the blade outer air seal and any thermal coatings applied to the blade outer air seal, thereby ensuring that the seal element does not exceed rated temperatures. The cooling is also, in some examples, utilized to reduce thermal gradients, by aiming, or targeting impingement jets 710 passing through the cooling holes 114 at higher stress areas of the blade outer air seal, thereby increasing the cooling effect in the targeted area. By way of example, in one embodiment, the impingement jets 710 are targeted at a radially outward facing surface 732 of the blade outer air seal 730. The impingement jets 710 are generated by provision of a cooling gas, such as air, to a radially outer portion of the blade outer air seal support 700 from a cooling air source 720.

While described above with specific regards to a segmented blade outer air seal mount, one of skill in the art having the benefit of this disclosure will understand that the concepts described herein can be applicable to full ring blade outer air seals, or other turbine flowpath components.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A blade outer air seal support comprising:
    at least one arc body including a first portion and a second portion;
    a blade outer air seal mounting region defined at least partially between the first portion and the second portion, and configured such that a blade outer air seal received in the mounting region contacts the first portion via a dynamic seal and directly contacts the second portion; and an interface feature interfacing the first portion and the second portion, the interface feature being configured such that axially aligned forces are communicated between the first and second portions through the interface feature, bypassing the blade outer air seal mounting region.

2. The blade outer air seal of claim 1, wherein the at least one arc body is a plurality of segments, each of said segments being connected to two adjacent segments via a featherseal.

3. The blade outer air seal of claim 1, wherein said first portion comprises a radially outward facing surface, said second portion comprises a radially inward facing surface, and said interface feature is at least partially comprised of contact between the radially outward facing surface and the radially inward facing surface.

4. The blade outer air seal support of claim 1, further comprising a plurality of fasteners protruding through said second portion into said first portion.

5. The blade outer air seal of claim 1, wherein the dynamic seal is a diaphragm seal.

6. The blade outer air seal support of claim 1, wherein the interface feature comprises:
an axially aligned intrusion into said first portion;
an axially aligned protrusion from said second portion; and
the axially aligned protrusion from said second portion is received in the axially aligned intrusion in said first portion.

7. The blade outer air seal support of claim 6, wherein the axially aligned intrusion includes a radially outward facing sealing surface, the axially aligned protrusion includes a radially inward facing sealing surface, and the radially outward facing sealing surface contacts the radially inward facing sealing surface.

8. The blade outer air seal support of claim 6, further comprising
an axially facing surface of said second portion extending radially inward from a base of the protrusion; and
an axially facing surface of said first portion is spaced apart from the axially facing surface of said second portion, and defines a gap between the axially facing surface of the second portion and the axially facing surface of the first portion.

9. The blade outer air seal support of claim 1, wherein an axially aligned section of at least one of said first and second portion includes a plurality of through holes configured to allow a cooling fluid to pass from a radially outward source to a radially outward facing surface of a blade outer air seal.

10. The blade outer air seal support of claim 1, wherein a blade outer air seal is mounted within said mounting region, and wherein said blade outer air seal is formed of a high thermal-resistance low-toughness material.

11. The blade outer air seal support of claim 10, wherein the high thermal-resistance low-toughness is one of a monolithic ceramic, a ceramic matrix composite, and a molybdenum based alloy.

12. The blade outer air seal support of claim 1, wherein the first portion and the second portion are constructed of the same material.

13. The blade outer air seal support of claim 1, wherein the first portion and the second portion are constructed of distinct materials.

14. The blade outer air seal support of claim 1, wherein a section of the interface feature disposed on said first portion is intermittent along an arc length of the arc body.

15. A method for protecting a blade outer air seal comprising:
mounting a blade outer air seal within a mounting region of a blade outer air seal support such that the blade outer air seal contacts a first portion of the blade outer air seal support via a dynamic seal and directly contacts a second portion of the blade outer air seal support; and
passing axial forces contacting the blade outer air seal support through an interface feature of the blade outer air seal support, thereby bypassing said blade outer air seal.

16. The method of claim 15 wherein the mounting region is defined, at least in part, by the first portion of the blade outer air seal support and the second portion of the blade outer air seal support, the first portion and the second portion being interfaced by the interface feature.

17. The method of claim 15, further comprising cooling a radially outward facing surface of the blade outer air seal by passing a cooling fluid through impingement cooling holes in said blade outer air seal support, thereby generating impingement coolant jets.

18. A blade outer air seal assembly comprising:
a plurality of blade outer air seal arc segments, each of said arc segments being connected to two adjacent arc segments via a featherseal;
each of said arc segments comprising a first portion connected to a second portion via an interface feature, the first portion and the second portion defining a radially inward mounting region;
a blade outer air seal received in the mounting region and contacting the first portion via a dynamic seal and directly contacting the second portion; and
the arc segments being configured such that axially aligned forces are passed through said interface feature, bypassing said mounting region.

19. The blade outer air seal of claim 18, wherein each of said arc segments is identical to each other segment of said arc segments.

* * * * *